(12) United States Patent
Chen et al.

(10) Patent No.: US 12,158,983 B2
(45) Date of Patent: Dec. 3, 2024

(54) TEXT INPUT METHOD AND APPARATUS, AND STORAGE MEDIUM

(71) Applicant: BEIJING XIAOMI MOBILE SOFTWARE CO., LTD., Beijing (CN)

(72) Inventors: Jialu Chen, Beijing (CN); Zhixiong Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/214,514

(22) Filed: Jun. 26, 2023

(65) Prior Publication Data

US 2024/0302889 A1 Sep. 12, 2024

(30) Foreign Application Priority Data

Mar. 10, 2023 (CN) .......................... 202310258273.5

(51) Int. Cl.
*G09G 5/00* (2006.01)
*G06F 3/01* (2006.01)
*G06F 3/04842* (2022.01)

(52) U.S. Cl.
CPC .......... *G06F 3/011* (2013.01); *G06F 3/04842* (2013.01)

(58) Field of Classification Search
CPC .... G06F 3/011; G06F 3/0482; G06F 3/04842; G06F 3/04886; G02B 27/017; G02B 2027/0178
See application file for complete search history.

(56) References Cited

U.S. PATENT DOCUMENTS

| 10,732,817 | B2 * | 8/2020 | Frączek | G06F 3/04845 |
| 11,308,694 | B2 * | 4/2022 | Nakata | G06F 3/013 |
| 11,340,712 | B2 * | 5/2022 | Lin | G10L 15/26 |
| 2013/0076669 | A1 * | 3/2013 | Ando | G06F 3/04886 |
| | | | | 345/173 |

(Continued)

FOREIGN PATENT DOCUMENTS

| CN | 108475178 A * | 8/2018 | ......... G06F 3/04886 |
| CN | 111142675 A * | 5/2020 | |
| WO | 2022198012 A1 | 9/2022 | |

OTHER PUBLICATIONS

Extended European Search Report issued in Application No. 23182846.8 dated Nov. 12, 2023, (11p).

*Primary Examiner* — Joe H Cheng
(74) *Attorney, Agent, or Firm* — Arch & Lake LLP (57) ABSTRACT

A text input method and apparatus, and a non-transitory computer readable storage medium are provided. In the text input method, in response to determining that a head-mounted display device is triggered for text input, the head-mounted display device displays a text input control in a target picture displayed by the head-mounted display device. The text input control may include a plurality of first child controls that correspond to characters, and each first child control displays corresponding characters respectively. Furthermore, in response to determining that a target first child control among the plurality of first child controls is triggered, the head-mounted display device determines target characters corresponding to the target first child control, determines a text to be inputted based on the target characters, and inputs the text to be inputted into a text input box displayed on the target picture.

19 Claims, 7 Drawing Sheets

(56) References Cited

U.S. PATENT DOCUMENTS

| | | | |
|---|---|---|---|
| 2015/0143269 A1* | 5/2015 | Liu | G06F 3/0488 |
| | | | 715/763 |
| 2015/0160856 A1* | 6/2015 | Jang | G06F 3/04886 |
| | | | 715/773 |
| 2017/0322623 A1* | 11/2017 | McKenzie | G06F 3/04886 |
| 2019/0311189 A1* | 10/2019 | Bryant, III | H04L 51/52 |
| 2019/0362557 A1* | 11/2019 | Lacey | G06T 5/20 |
| 2020/0033936 A1* | 1/2020 | Sugaya | G06F 3/017 |
| 2021/0064132 A1* | 3/2021 | Rubin | G06F 3/016 |
| 2022/0035154 A1* | 2/2022 | Kondoh | G02B 27/017 |
| 2022/0236809 A1* | 7/2022 | von und zu Liechtenstein | |
| | | | G06F 3/0485 |
| 2023/0009807 A1 | 1/2023 | Xu et al. | |

* cited by examiner

FIG. 3 in response to determining that target first child control among plurality of first child controls is triggered and duration of target first child control being triggered is less than or equal to predetermined duration, respective characters corresponding to target first child control are determined as target characters respectively — S21

TEXT INPUT METHOD AND APPARATUS, AND STORAGE MEDIUM

CROSS-REFERENCE TO RELATED APPLICATION

This application is based on and claims priority to Chinese Patent Application No. 202310258273.5 filed on Mar. 10, 2023, the disclosure of which is hereby incorporated by reference in its entirety for all purposes.

BACKGROUND

At present, the mainstream Augmented Reality (AR) devices generally use accessories such as handles or remote controllers as control terminals during interactive control to perform interactive control.

SUMMARY

The present disclosure relates to the field of Augmented Reality (AR) technologies, and more specifically, to a text input method and apparatus, and a storage medium. In order to overcome the problems existing in the related technologies, the present disclosure provides a text input method and apparatus, and a storage medium.

According to a first aspect of the present disclosure, there is provided a text input method, applied to a head-mounted display device, including:
  in response to determining that the head-mounted display device is triggered for text input, displaying a text input control in a target picture displayed by the head-mounted display device, where the text input control includes a plurality of first child controls that have correspondence with characters, and each first child control displays corresponding characters respectively;
  in response to determining that a target first child control among the plurality of first child controls is triggered, determining target characters corresponding to the target first child control; and
  determining a text to be inputted based on the target characters, and inputting the text to be inputted into a text input box displayed on the target picture.

According to a second aspect of the present disclosure, there is provided a text input apparatus, including:
  a display module configured to, in response to determining that a head-mounted display device is triggered for text input, display a text input control in a target picture displayed by the head-mounted display device, where the text input control includes a plurality of first child controls that have correspondence with characters, and each first child control displays corresponding characters respectively; and
  a processing module configured to, in response to determining that a target first child control among the plurality of first child controls is triggered, determine target characters corresponding to the target first child control; determine a text to be inputted based on the target characters, and input the text to be inputted into a text input box displayed on the target picture.

According to a third aspect of the present disclosure, there is provided a text input apparatus, including: a processor; a memory for storing instructions executable by the processor; in which, the processor is configured to implement the text input method described above in the first aspect and according to any one of the embodiments thereof.

According to a fourth aspect of the present disclosure, there is provided a non-transitory computer-readable storage medium, when instructions in the storage medium are executed by a processor of a head-mounted display device, the head-mounted display device is enabled to execute the text input method described above in the first aspect and according to any one of the embodiments thereof.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Description will now be made in detail to examples, examples of which are illustrated in the accompanying drawings. The following description refers to the accompanying drawings in which the same numbers in different drawings represent the same or similar elements unless otherwise indicated. The implementations in the following description of examples do not represent all implementations consistent with the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As described in the background, the mainstream Augmented Reality (AR) devices generally use accessories such as handles or remote controllers as control terminals during interactive control to perform interactive control. However, for the daily use scenarios of the user such as AR glasses, it is necessary to keep light in the process of interactive control, accessories often cause inconvenience to daily use, and more additional accessories add to the daily burden.

On this basis, embodiments of the present disclosure provide a text input method, which enables the user to directly input text in a head-mounted display device without the aid of accessories.

Figure 1:
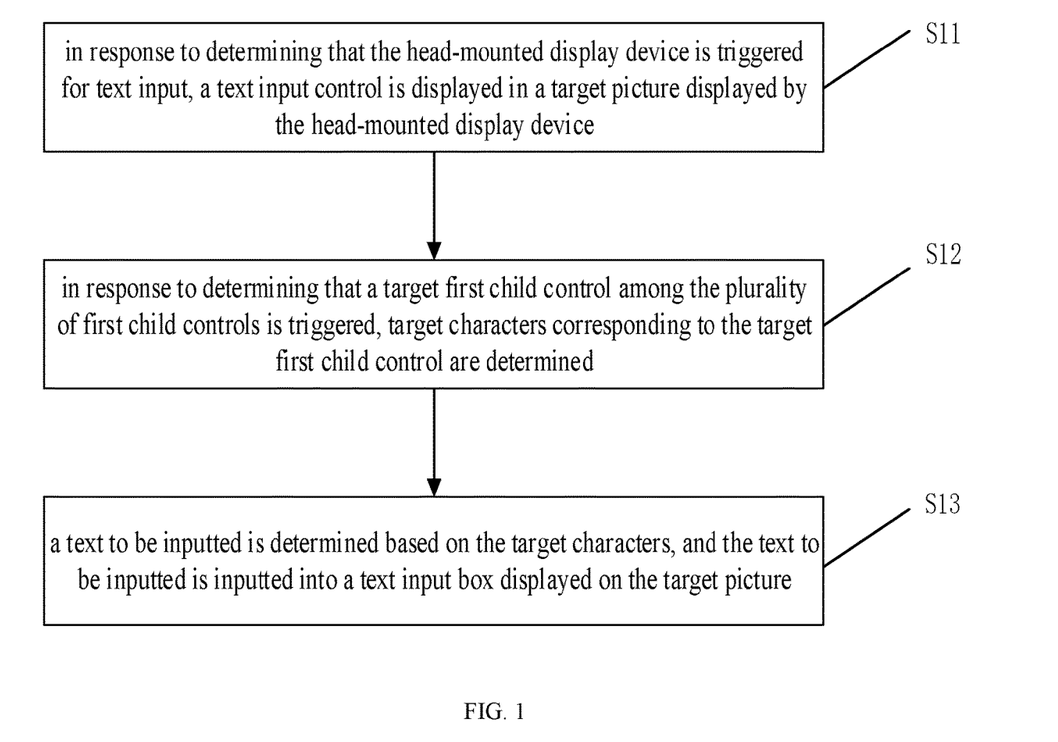
FIG. 1 is a flowchart of a text input method according to an example.

FIG. 1 is a flowchart of a text input method according to an example, as shown in FIG. 1, the text input method is used in a head-mounted display device and includes the following steps.

In step S11, in response to determining that the head-mounted display device is triggered for text input, a text input control is displayed in a target picture displayed by the head-mounted display device.

In some embodiments, the head-mounted display device includes a peripheral screen touch area and a display interface, and the user views text, video and other contents through a picture displayed by the display interface. It should be noted that the peripheral screen touch area does not necessarily have a display screen, as long as it can receive the user's pressing signal or touch signal.

For example, when the user presses the peripheral screen touch area of the head-mounted display device for more than a predetermined time, the head-mounted display device is triggered for text input, and a text input control is displayed in the target picture. For example, the predetermined time is 1 s.

In some embodiments, the position of the text input control is not fixed, and it can move along with the position where the user touches or presses.

In some embodiments, the text input control includes a plurality of first child controls, the first child controls have a correspondence with characters, and respective first child controls display corresponding characters respectively.

For example, the first child controls have correspondence with the 26 letters. For example, the first child control 1 displays three characters ABC, the first child control 2 displays three characters DEF, the first child control 3 displays three characters GHI, and so forth.

In step S12, in response to determining that a target first child control among the plurality of first child controls is triggered, target characters corresponding to the target first child control are determined.

For example, taking the correspondence between the first child controls and the 26 letters as an example, in response to determining that the target first child control is triggered, and the characters corresponding to the target first child control are ABC, then the target characters are ABC.

In step S13, a text to be inputted is determined based on the target characters, and the text to be inputted is inputted into a text input box displayed on the target picture.

In an embodiment, after the user triggers the target first child control, it slides from the current position to the position of the target characters, and the text to be inputted is determined based on the target characters when the time for sliding to the position of the target characters meets the predetermined requirements.

In the embodiments of the present disclosure, the user can input text based on the text input control by triggering the text input control of the head-mounted display device, without the aid of other auxiliary accessories, thereby the efficiency of text input is improved and the connection time of accessories is saved.

In some embodiments, the configuration of the text input control is concentric rings, and each ring in the concentric rings displays at least one child control of the text input control.

Figure 2:
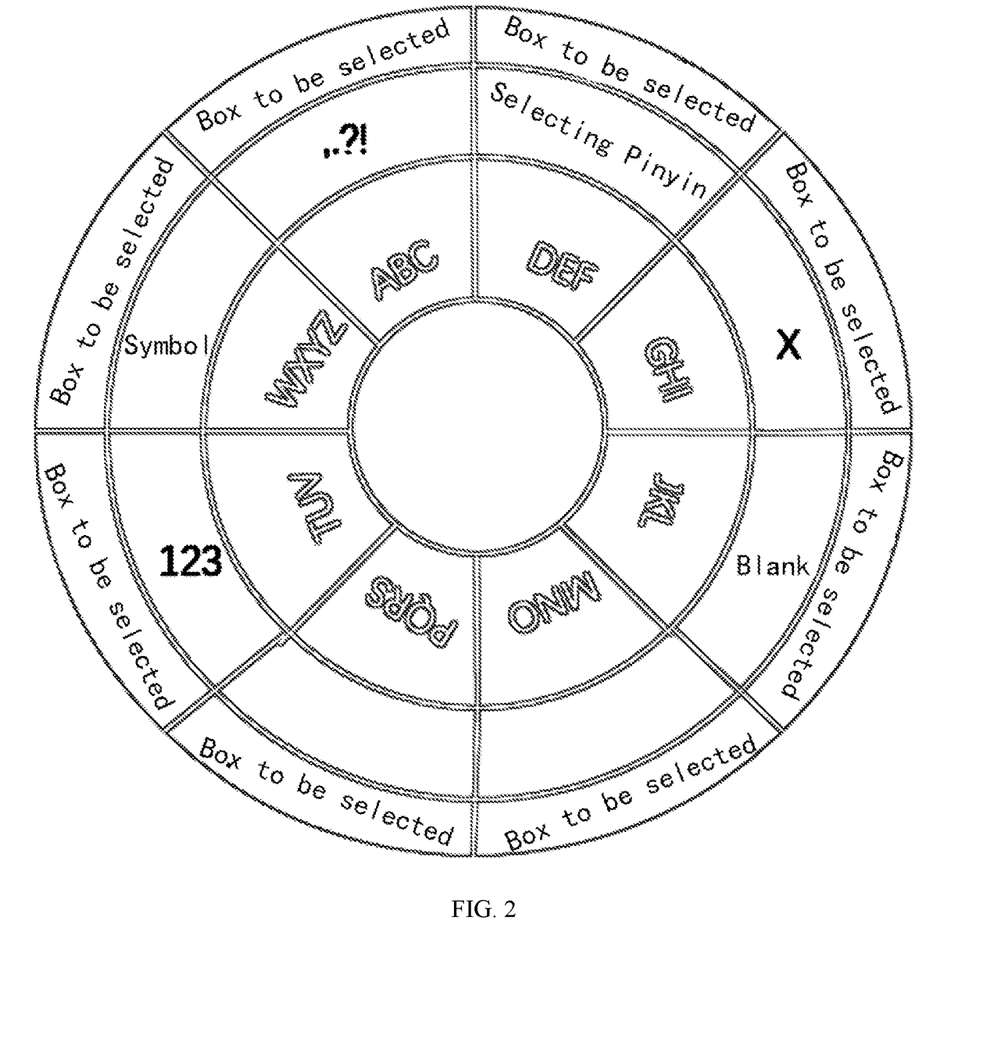
FIG. 2 is a schematic diagram of a text input control according to an example.

For example, as shown in FIG. 2, the central area of the concentric rings is the position where the user's finger presses when triggering text input, the first ring area outside the central area of the concentric rings is the first child control, the first child control has a correspondence with characters, and each first child control displays corresponding characters respectively; the second ring area outside the central area of the concentric rings includes a third child control and a fourth child control, the third child control is configured to switch characters corresponding to the first child control, for example, the controls such as "123", "Select Pinyin (pronunciation)" and "Symbol" is the third child control, and the fourth child control is configured to delete the text having been inputted in the text input box, for example, the character "x" in FIG. 2 is the fourth child control; the third ring area outside the central area of the concentric rings is a second child control, the second child control is configured to display the text matching the target characters, for example, the area "box to be selected" in FIG. 2 is the second child control.

Of course, the configuration of the text input control can also be other configurations, such as the common nine-grid form. The following embodiments of the present disclosure take the configuration of the text input control as concentric rings as an example.

Figure 3:
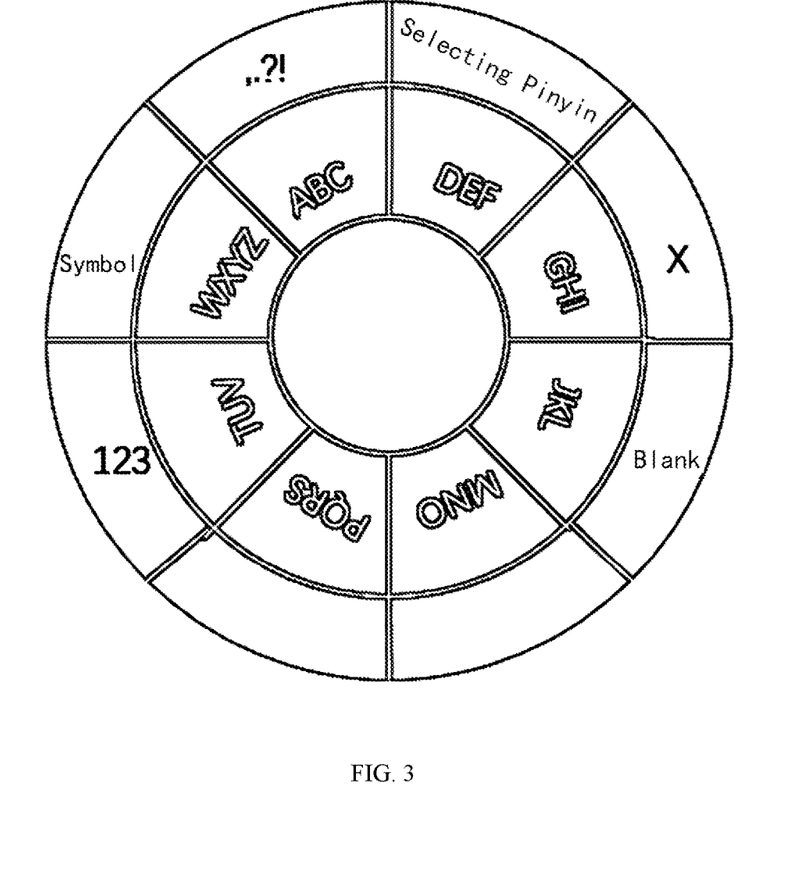
FIG. 3 is a schematic diagram of a text input control according to an example.

In some embodiments, each of the first child controls corresponds to at least two characters. For example, as shown in FIG. 3, the first ring area outside the central area of the concentric rings includes a plurality of first child controls, and the plurality of first child controls respectively correspond to at least two characters among the 26 letters.

Figure 4:
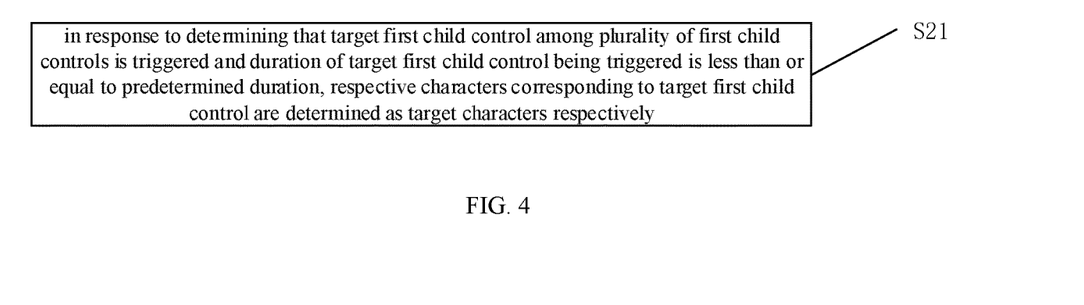
FIG. 4 is a flowchart of a text input method according to an example.

In an embodiment, the user can quickly trigger the target first child control, and select the spelling word corresponding to the target first child control, which corresponds to the input mode of the conventional nine-grid input method, as shown in FIG. 4, the above step S12 can be specifically implemented as step S21:

In step S21, in response to determining that a target first child control among the plurality of first child controls is triggered and a duration of the target first child control being triggered is less than or equal to a predetermined duration, respective characters corresponding to the target first child control are determined as target characters respectively.

For example, it is determined that the target first child control is triggered, and the duration of the target first child control being triggered is less than or equal to a predetermined duration, for example, the predetermined duration is 1 s, the duration of the target first child control being triggered is 0.5 s, the target first child control corresponds to three characters ABC, then the target character can be the spelling word such as "a", "no", "ba" to which characters ABC can correspond.

In the embodiments of the present disclosure, by determining that the target first child control is triggered and the duration of the target first child control being triggered is less than or equal to the predetermined duration, respective characters corresponding to the target first child control are determined as target characters respectively, and the user can determine the text to be inputted by selecting the target characters, without the aid of other auxiliary accessories, thereby the efficiency of text input is improved and the connection time of accessories is saved.

Figure 5:
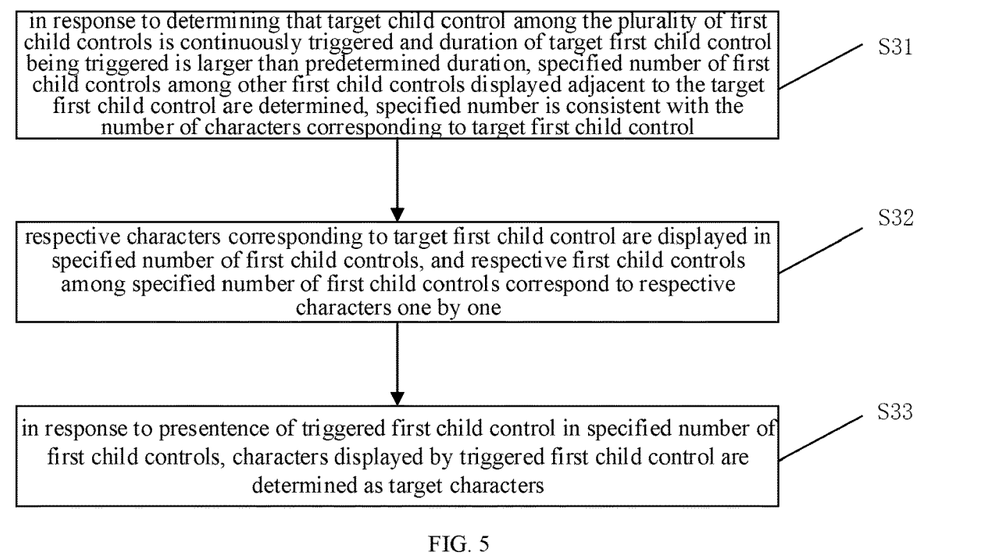
FIG. 5 is a flowchart of a text input method according to an example.

In another embodiment, the user can select to long-press the target first child control, the target characters corresponding to the target first child control appear in the position of adjacent areas of the target first child control, and the user can determine the text to be inputted by selecting the target characters in different areas. As shown in FIG. 5, the above step S12 can be implemented as steps S31-S33:

In step S31, in response to determining that the target child control among the plurality of first child controls is continuously triggered and a duration of the target first child control being triggered is larger than a predetermined duration, a specified number of first child controls among other first child controls displayed adjacent to the target first child control are determined, the specified number is consistent with the number of characters corresponding to the target first child control.

For example, the number of characters corresponding to the target first child control is three characters ABC, and then three first child controls are determined among other first child controls displayed adjacent to the target first child control.

In step S32, respective characters corresponding to the target first child control are displayed in the specified number of first child controls, and respective first child controls among the specified number of first child controls correspond to the respective characters one by one.

Figure 6:
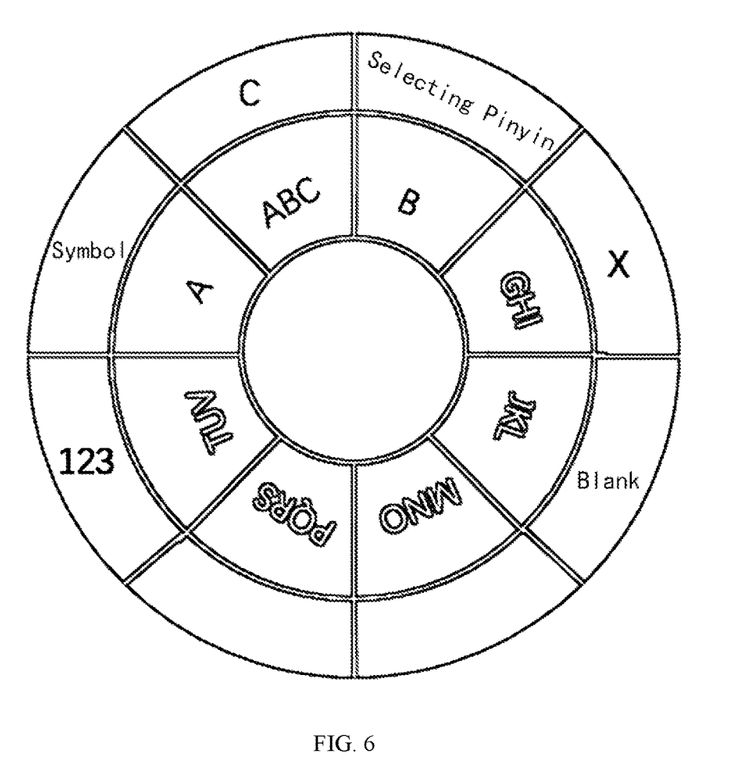
FIG. 6 is a schematic diagram of a text input control according to an example.

For example, as shown in FIG. 6, the characters corresponding to the target first child control are A, B and C, and then A, B and C will be displayed in the three first child control areas adjacent to the target first child control.

In step S33, in response to presentence of the triggered first child control in the specified number of first child controls, the characters displayed by the triggered first child control are determined as the target characters.

For example, the character displayed by the triggered first child control is C, and then the target character is C.

In the embodiments of the present disclosure, the user can select to long-press the target first child control, the target characters corresponding to the target first child control respectively appear in the position of the adjacent areas of the target first child control, and the user can determine the text to be inputted by selecting the target characters in different areas, without the aid of other auxiliary accessories, thereby the efficiency of text input is improved and the connection time of accessories is saved.

In some embodiments, the user can select the corresponding text through the target characters as the text to be inputted, or directly select the target characters as the text to be inputted.

Figure 7:
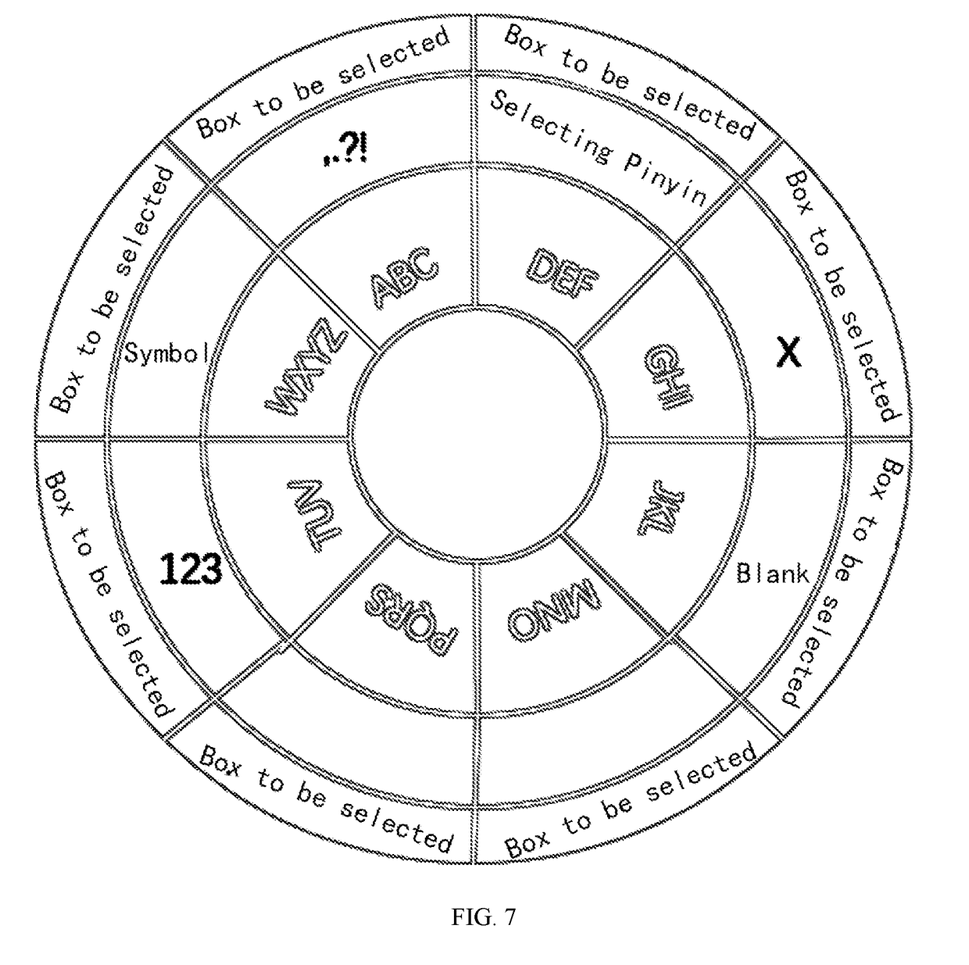
FIG. 7 is a schematic diagram of a text input control according to an example.

In an embodiment, if the current text input scenario is the Pinyin input scenario, the text input control further includes a second child control, and the second child control is configured to display the text matching the target characters. In this case, if it is determined that the target second child control in the second child control is triggered, the text displayed by the target second child control is determined as the text to be inputted.

For example, as shown in FIG. 7, the second child control is located in the outermost ring area of the concentric rings, and the text matching the target characters will be displayed in a candidate box (e.g., one "Box to be selected" in FIG. 7) in the outermost ring area.

In another embodiment, if the current text input scenario is the character input scenario, the target characters are determined as the text to be inputted. For example, if the target character is B, then the text to be inputted is B.

In the embodiments of the present disclosure, the user can further determine the text to be inputted in different ways by selecting the character input scenario or the Pinyin input scenario, without the aid of other auxiliary accessories, thereby the efficiency of text input is improved and the connection time of accessories is saved.

Figure 8:
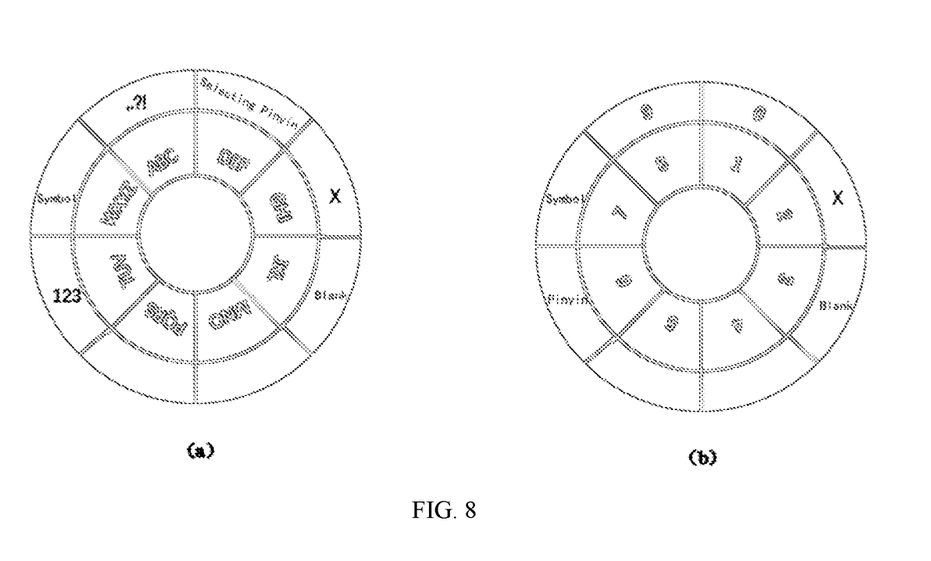
FIG. 8 is a schematic diagram of a text input control according to some examples.

In some embodiments, the text input control further includes a plurality of third child controls, and the third child controls are configured to switch characters corresponding to the first child controls.

For example, as shown by (a) in FIG. 8, the outermost concentric ring includes a plurality of third child controls, for example, the areas of "Selecting Pinyin", "123", "Symbol" correspond to one third child control respectively. If the third child control "123" is triggered, as shown by (b) in FIG. 8, the corresponding characters in the first child control area are the characters of the numbers 1 to 9 respectively.

In an embodiment, the user releases the finger after selecting the third child control "123", the text input control will not change and it still remains in the style after the third child control "123" is triggered. If the user needs to return to the Pinyin input style or the character input style, the user needs to select the corresponding third child control again.

It should be noted that the user's sliding or moving gestures can be recognized by ways of using a visual camera in the head-mounted display device or using other sensors (such as wearing an electromyography monitoring device) etc.

In the embodiments of the present disclosure, the user can select different characters by selecting the third child control, without the aid of other auxiliary accessories, thereby the efficiency of text input is improved and the connection time of accessories is saved.

In some embodiments, the text input control further includes a fourth child control, and the fourth child control is configured to delete the text already entered in the text input box.

In some embodiments, correspondence between the first child controls and the characters is determined based on the nine-grid input method.

For example, there are seven first child controls, the first child control 1 corresponds to three characters ABC, the first child control 2 corresponds to three characters DEF, the first child control 3 corresponds to three characters GHI, the first child control 4 corresponds to three characters JKL, the first child control 5 corresponds to three characters MNO, the first child control 6 corresponds to four characters PQRS, the first child control 7 corresponds to three characters TUV, and the first child control 8 corresponds to four characters WXYZ.

Of course, the characters corresponding to the first child control in the embodiments of the present disclosure are not limited to the 26 uppercase letters, but can also be the 26 lowercase letters or the five-stroke input method, and the user can change the input method based on his or her own input habit.

In some embodiments, the head-mounted display device can also receive an instruction transmitted by other devices, and text input is triggered through the instruction.

In an embodiment, in response to receiving a first instruction transmitted by a first device, it is determined that the head-mounted display device is triggered for text input, herein the first instruction is used to instruct the head-mounted device to display the text input control.

Furthermore, in response to receiving a second instruction transmitted by the first device, it is determined that the specified child control of the text input control is triggered, herein the second instruction is used to instruct the triggered specified child control, and the specified child control includes at least one of a first child control, a second child control, a third child control and a fourth child control.

In the embodiments of the present disclosure, the head-mounted display device receives the instruction and updates the displayed target picture based on the instruction.

In another embodiment, in response to receiving a first data stream transmitted by a second device, it is determined that the head-mounted display device is triggered for text input, and a text input control is displayed in the displayed target picture based on the first data stream; herein, the first data stream satisfies the requirement of causing the head-mounted display device to display the target picture containing the text input control.

Furthermore, in response to receiving a second data stream transmitted by the second device, it is determined that the specified child control is triggered. Herein, the second data stream satisfies the requirement of causing the head-mounted display device to display a target picture updated based on the triggered specified child control, and the specified child control includes a first child control, a second child control or a third child control.

In the embodiments of the present disclosure, the head-mounted display device is used as a display for displaying, and the target picture triggered by the data stream correspondingly is displayed by receiving the data stream of other devices, without using other auxiliary accessories, thereby the efficiency of text input is improved and the connection time of accessories is saved.

Based on the same concept, the embodiments of the present disclosure further provide a text input apparatus.

It can be understood that, in order to realize the above functions, the text input apparatus provided by the embodiments of the present disclosure includes corresponding hardware structures and/or software modules for executing the respective functions. In combination with the units and algorithm steps of the respective examples disclosed in the embodiments of the present disclosure, the embodiments of the present disclosure can be implemented in the form of hardware or a combination of hardware and computer software. As for whether a certain function is performed by hardware or in the manner of computer software driving hardware, it depends on the specific application and design constraint of the technical solutions. Those skilled in the art can use different methods to realize the described functions for each specific application, but this realization should not be considered as beyond the scope of the technical solutions of the embodiments of the present disclosure.

Figure 9:
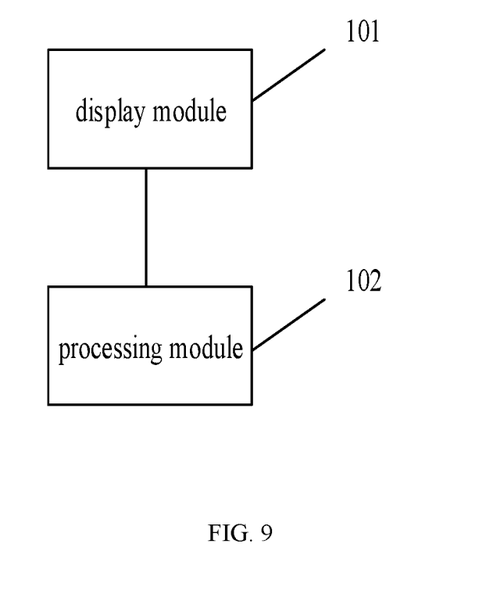
FIG. 9 is a block diagram of a text input apparatus according to an example.

FIG. 9 is a block diagram of a text input apparatus according to an example. Referring to FIG. 9, the apparatus includes a display module 101 and a processing module 102.

The display module 101 is configured to, in response to determining that a head-mounted display device is triggered for text input, display a text input control in a target picture displayed by the head-mounted display device; herein, the text input control includes a plurality of first child controls, the first child controls have correspondence with characters, and respective first child controls display corresponding characters respectively.

The processing module 102 is configured to, in response to determining that a target first child control among the plurality of first child controls is triggered, determine target characters corresponding to the target first child control; determine a text to be inputted based on the target characters, and input the text to be inputted into a text input box displayed on the target picture.

In an embodiment, each of the first child controls corresponds to at least two characters.

The processing module 102 is further configured to, in response to determining that a target first child control among the plurality of first child controls is triggered and a duration of the target first child control being triggered is less than or equal to a predetermined duration, determine respective characters corresponding to the target first child control as target characters respectively.

In an embodiment, the processing module 102 is further configured to, in response to determining that the target child control among the plurality of first child controls is continuously triggered and a duration of the target first child control being triggered is larger than a predetermined duration, determine a specified number of first child controls among other first child controls displayed adjacent to the target first child control, the specified number being consistent with the number of characters corresponding to the target first child control; display respective characters corresponding to the target first child control in the specified number of first child controls, respective first child controls among the specified number of first child controls corresponding to the respective characters one by one; and in response to presentence of the triggered first child control in the specified number of first child controls, determine the characters displayed by the triggered first child control as the target characters.

In an embodiment, the text input control further includes a second child control, the second child control is configured to display a text that matches the target characters; the processing module 102 is configured to, in response to that a target second child control among the second child controls is triggered, determine the text displayed by the target second child control as the text to be inputted.

In an embodiment, the processing module 102 is configured to determine the target characters as the text to be inputted.

In an embodiment, the text input control further includes a plurality of third child controls, and the third child controls are configured to switch characters corresponding to the first child controls.

In an embodiment, the text input control further includes a fourth child control, and the fourth child control is configured to delete the text already entered in the text input box.

In an embodiment, the correspondence between the first child controls and the characters is determined based on the nine-grid input method.

In an embodiment, a configuration of the text input control is concentric rings, and each ring in the concentric rings displays at least one child control of the text input control.

In an embodiment, the processing module 102 is configured to, in response to that a first instruction for instructing the head-mounted device to display the text input control as transmitted by a first device is received, determine that the head-mounted display device is triggered for text input; and the processing module 102 is configured to, in response to that a second instruction for indicating the triggered specified child control as transmitted by the first device is received, determine that the specified child control of the text input control is triggered.

In an embodiment, the processing module 102 is configured to, in response to that a first data stream transmitted by a second device is received, determine that the head-mounted display device is triggered for text input, and display a text input control in the displayed target picture based on the first data stream; herein, the first data stream satisfies the requirement of causing the head-mounted display device to display the target picture containing the text input control;

The processing module 102 is configured to, in response to that a second data stream transmitted by the second device is received, determine that the specified child control is triggered; herein, the second data stream satisfies the requirement of causing the head-mounted display device to display a target picture updated based on the triggered specified child control.

The specific manners in which operations are executed by the respective modules in the apparatus of the above embodiments have been described in detail in the embodiments related to the method, and will not be repeated herein.

The technical solutions provided by embodiments of the present disclosure can include the following beneficial effects: it is determined that the head-mounted display device is triggered for text input, a text input control is displayed in a target picture displayed by the head-mounted display device; the text input control includes a plurality of first child controls, the first child controls have correspondence with characters, and respective first child controls display corresponding characters respectively; in response to determining that a target first child control among the plurality of first child controls is triggered, target characters corresponding to the target first child control are determined; and a text to be inputted is determined based on the target characters, and the text to be inputted is inputted into a text input box displayed on the target picture. Therefore, the user can directly input the text in the head-mounted display device, without the aid of other auxiliary accessories, thereby the efficiency of text input is improved and the connection time of accessories is saved.

Figure 10:
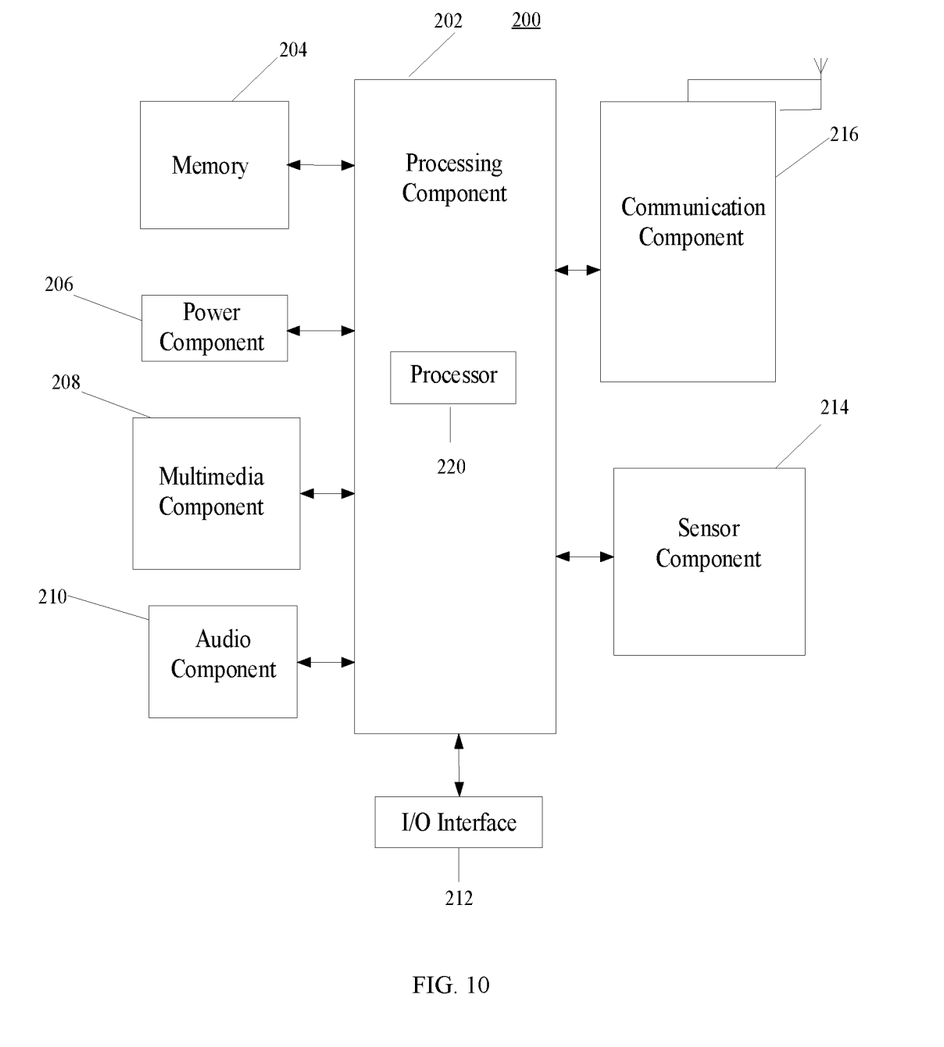
FIG. 10 is a block diagram of a device for text input according to an example.

FIG. 10 is a block diagram of a device 200 for text input according to an example. For example, the device 200 can be a head-mounted display device such as AR glasses.

Referring to FIG. 10, the device 200 can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the device 200, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the device 200. The power component 206 can include a power management system, one or more power sources, and any other components associated with the generation, management, and distribution of power in the device 200.

The multimedia component 208 includes a screen providing an output interface between the device 200 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive an external multimedia datum while the device 200 is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone ("MIC") configured to receive an external audio signal when the device 200 is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide status assessments of various aspects of the device 200. For instance, the sensor component 214 can detect an open/closed status of the device 200, relative locating of components, e.g., the display and the keypad, of the device 200, a change in position of the device 200 or a component of the device 200, a presence or absence of user contact with the device 200, an orientation or an acceleration/deceleration of the device 200, and a change in temperature of the device 200. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate communication, wired or wirelessly, between the device 200 and other devices. The device 200 can access a wireless network based on a communication standard, such as Wi-Fi, 2G, 3G, or a combination thereof. In one example, the communication component 216 receives a broadcast signal or broadcast associated information from an external broadcast management system via a broadcast channel. In one example, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some examples, the device 200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some examples, there is further provided a non-transitory computer-readable storage medium including instructions, such as included in the memory 204, executable by the processor 220 in the device 200, for performing the above described methods. For example, the non-transitory computer-readable storage medium can be a ROM, a RAM, a CD-ROM, a magnetic tape, a floppy disc, an optical data storage device, and the like.

It can be understood that "a plurality of" in the present disclosure refers to two or more, and other quantifiers are similar. The "and/or", which describes the association relationship of related objects, means that there can be three types of relationship, for example, A and/or B can mean three cases that A exists alone, A and B exist together, and B exists alone. The character "/" generally indicates that the associated objects in the context are of an "or" relationship. The singular forms "a/an", "the" and "said" are also intended to include the plural forms, unless the context clearly indicates other meaning.

It can be further understood that the terms "first" and "second" and the like are used to describe various types of information, but these information should not be limited to these terms. These terms are only used to distinguish the same type of information from each other and do not indicate a specific order or importance. In fact, the expressions "first" and "second" and the like can be used interchangeably. For example, without departing from the scope of the present disclosure, the first information can also be referred to as the second information, and similarly, the second information can also be referred to as the first information.

It can be further understood that unless otherwise specified, "connection" includes direct connection between two without other components, and also includes indirect connection between two with other components.

It can be further understood that although the operations are described in a specific order in the drawings in the embodiments of the present disclosure, it should not be understood that these operations are required to be performed in the specific order or in the serial order shown, or all the operations shown are required to be performed to obtain the desired results. In certain circumstances, multitasking and parallel processing can be beneficial.

Other embodiments of the present disclosure can be available to those skilled in the art upon consideration of the specification and practice of the various embodiments disclosed herein. The present application is intended to cover any variations, uses, or adaptations of the present disclosure following general principles of the present disclosure and including the common general knowledge or conventional technical means in the art. The specification and embodiments can be shown as illustrative only, and the true scope and spirit of the present disclosure are indicated by the following claims.

It will be understood that the present disclosure is not limited to the exact construction that has been described above and illustrated in the accompanying drawings, and that various modifications and changes can be made without departing from the scope thereof. It is intended that the scope of the present disclosure is limited only by the appended claims.

What is claimed is:

1. A text input method, comprising:
in response to determining that a head-mounted display device is triggered for text input, displaying, by the head-mounted display device, a text input control in a target picture displayed by the head-mounted display device, wherein the text input control comprises a plurality of first child controls corresponding to characters, and each first child control displays corresponding characters respectively;
in response to determining that a target first child control among the plurality of first child controls is triggered, determining, by the head-mounted display device, target characters corresponding to the target first child control; and
determining, by the head-mounted display device, a text to be inputted based on the target characters, and inputting, by the head-mounted display device, the text to be inputted into a text input box displayed on the target picture,
wherein a configuration of the text input control is concentric rings, and each ring in the concentric rings displays at least one child control of the text input control.

2. The text input method according to claim 1, wherein each first child control corresponds to at least two characters, and wherein in response to determining that the target first child control among the plurality of first child controls is triggered, determining the target characters corresponding to the target first child control comprises:
in response to determining that the target first child control among the plurality of first child controls is triggered and in response to determining that a duration of the target first child control being triggered is less than or equal to a predetermined duration, determining characters corresponding to the target first child control as target characters.

3. The text input method according to claim 2, wherein in response to determining that the target first child control among the plurality of first child controls is triggered, determining the target characters corresponding to the target first child control further comprises:
in response to determining that the target first child control among the plurality of first child controls is continuously triggered and the duration of the target first child control being triggered is larger than the predetermined duration, determining a specified number of first child controls among other first child controls displayed adjacent to the target first child control, wherein the specified number is consistent with a number of characters corresponding to the target first child control;
displaying respective characters corresponding to the target first child control in the specified number of first child controls, respective first child controls among the specified number of first child controls corresponding to the respective characters one by one; and in response to determining that a first child control in the specified number of first child controls is triggered, determining characters displayed by the first child control that is triggered as the target characters.

4. The text input method according to claim 3, wherein determining the text to be inputted based on the target characters comprises:

determining the target characters as the text to be inputted.

5. The text input method according to claim 2, wherein the text input control further comprises a second child control configured to display a text that matches the target characters;

wherein determining the text to be inputted based on the target characters comprises:

in response to determining that a target second child control among the second child controls is triggered, determining the text displayed by the target second child control as the text to be inputted.

6. The text input method according to claim 1, wherein the text input control further comprises a plurality of third child controls, and the third child controls are configured to switch characters corresponding to the first child controls.

7. The text input method according to claim 1, wherein the text input control further comprises a fourth child control, and the fourth child control is configured to delete a text that has been entered in the text input box.

8. The text input method according to claim 1, wherein a correspondence between the first child controls and the characters is determined based on a nine-grid input method.

9. The text input method according to claim 1, wherein determining that the head-mounted display device is triggered for text input comprises:

in response to receiving a first instruction transmitted by a first device, determining that the head-mounted display device is triggered for text input, wherein the first instruction is configured to instruct the head-mounted display device to display the text input control; and wherein the method further comprises determining a specified child control of the text input control is triggered in a following manner:

in response to receiving that a second instruction transmitted by the first device, determining that the specified child control of the text input control is triggered, wherein the second instruction is configured to indicate the triggered specified child control, wherein the specified child control comprises at least one of following control: a first child control, a second child control, a third child control, or a fourth child control.

10. The text input method according to claim 1, wherein in response to determining that the head-mounted display device is triggered for text input, displaying the text input control in the target picture comprises:

in response to receiving a first data stream transmitted by a second device, determining that the head-mounted display device is triggered for text input, and displaying the text input control in the displayed target picture based on the first data stream, wherein the first data stream satisfies causing the head-mounted display device to display the target picture containing the text input control; and wherein the method further comprises determining that a specified child control is triggered in a following manner:

in response to receiving a second data stream transmitted by the second device, determining that the specified child control is triggered, wherein the second data stream satisfies causing the head-mounted display device to display the target picture updated based on the triggered specified child control, and wherein the specified child control comprises at least one of following controls: a first child control, a second child control or a third child control.

11. A non-transitory computer readable storage medium, wherein when instructions in the storage medium are executed by a processor of a head-mounted display device, the head-mounted display device is caused to execute the text input method according to claim 1.

12. A text input apparatus, comprising:

a display circuit for, in response to determining that a head-mounted display device is triggered for text input, displaying a text input control in a target picture displayed by the head-mounted display device, wherein the text input control comprises a plurality of first child controls corresponding to characters, and each first child control displays corresponding characters respectively; and a processing circuit for, in response to determining that a target first child control among the plurality of first child controls is triggered, determining target characters corresponding to the target first child control; determining a text to be inputted based on the target characters, and inputting the text to be inputted into a text input box displayed on the target picture, wherein a configuration of the text input control is concentric rings, and each ring in the concentric rings displays at least one child control of the text input control.

13. A text input apparatus, comprising:

a processor;

a memory for storing instructions executable by the processor;

wherein the processor is configured to implement:

in response to determining that a head-mounted display device is triggered for text input, displaying a text input control in a target picture displayed by the head-mounted display device, wherein the text input control comprises a plurality of first child controls corresponding to characters, and each first child control displays corresponding characters respectively;

in response to determining that a target first child control among the plurality of first child controls is triggered, determining target characters corresponding to the target first child control; and determining a text to be inputted based on the target characters, and inputting the text to be inputted into a text input box displayed on the target picture, wherein a configuration of the text input control is concentric rings, and each ring in the concentric rings displays at least one child control of the text input control.

14. The text input apparatus according to claim 13, wherein each first child control corresponds to at least two characters, and wherein in response to determining that the target first child control among the plurality of first child controls is triggered, determining the target characters corresponding to the target first child control comprises:

in response to determining that the target first child control among the plurality of first child controls is triggered and in response to determining that a duration of the target first child control being triggered is less than or equal to a predetermined duration, determining characters corresponding to the target first child control as target characters.

15. The text input apparatus according to claim 14, wherein in response to determining that the target first child control among the plurality of first child controls is triggered, determining the target characters corresponding to the target first child control further comprises:
in response to determining that the target first child control among the plurality of first child controls is continuously triggered and the duration of the target first child control being triggered is larger than the predetermined duration, determining a specified number of first child controls among other first child controls displayed adjacent to the target first child control, wherein the specified number is consistent with a number of characters corresponding to the target first child control;
displaying respective characters corresponding to the target first child control in the specified number of first child controls, respective first child controls among the specified number of first child controls corresponding to the respective characters one by one; and
in response to determining that a first child control in the specified number of first child controls is triggered, determining characters displayed by the first child control that is triggered as the target characters.

16. The text input apparatus according to claim 15, wherein determining the text to be inputted based on the target characters comprises:
determining the target characters as the text to be inputted.

17. The text input apparatus according to claim 14, wherein the text input control further comprises a second child control configured to display a text that matches the target characters;
wherein determining the text to be inputted based on the target characters comprises:
in response to determining that a target second child control among the second child controls is triggered, determining the text displayed by the target second child control as the text to be inputted.

18. The text input apparatus according to claim 13, wherein the text input control further comprises a plurality of third child controls, and the third child controls are configured to switch characters corresponding to the first child controls.

19. The text input apparatus according to claim 13, wherein the text input control further comprises a fourth child control, and the fourth child control is configured to delete a text that has been entered in the text input box.

* * * * *